United States Patent [19]

Motomura

[11] Patent Number: 5,377,349
[45] Date of Patent: Dec. 27, 1994

[54] STRING COLLATING SYSTEM FOR SEARCHING FOR CHARACTER STRING OF ARBITRARY LENGTH WITHIN A GIVEN DISTANCE FROM REFERENCE STRING

[75] Inventor: Masato Motomura, Tokyo, Japan

[73] Assignee: NEC Corporation, Tokyo, Japan

[21] Appl. No.: 958,467

[22] Filed: Oct. 8, 1992

Related U.S. Application Data

[63] Continuation of Ser. No. 426,636, Oct. 25, 1989, abandoned.

[30] Foreign Application Priority Data

Oct. 25, 1988 [JP] Japan .................. 63-269746

[51] Int. Cl.$^5$ .............................................. G06F 7/06
[52] U.S. Cl. .................................. 395/600; 364/259.2; 364/225.6; 364/259.5; 364/DIG. 1; 395/800
[58] Field of Search ............... 395/500, 600, 800

[56] References Cited

U.S. PATENT DOCUMENTS

| 4,630,234 | 12/1986 | Holly | 395/600 |
| 4,823,306 | 4/1989 | Barbic | 395/600 |
| 4,916,655 | 4/1990 | Ohsone | 395/600 |

FOREIGN PATENT DOCUMENTS

| 0178651 | 4/1986 | European Pat. Off. |
| 61-95442 | 5/1986 | Japan. |

Primary Examiner—Eric Coleman
Attorney, Agent, or Firm—Foley & Lardner

[57] ABSTRACT

A string collating system comprises an input device receiving a reference string and a string to be collated and for generating a coincidence signal when each constituent of the string to be collated is coincident to one character of the reference string, and a string comparator composed of cells arranged in M columns and in N rows (where M and N are integer), each cell $f_{i,j}$ (i=1 to M-1 and j=1 to N-1) being coupled to a rightward adjacent cell $f_{i,j+1}$ through a first transfer circuit and also coupled to a downwardly adjacent cell $f_{i+1,j}$ through a second transfer circuit, each cell $f_{i,j}$ is further coupled to a rightward adjacent cell $f_{i+1,j+1}$ through a third transfer circuit and also coupled to a rightward adjacent cell $f_{i+1,j+1}$ through an automatic setting circuit, the cells in a first row being coupled to the input device so as to receive the coincidence signal, the first transfer circuit operating to transfer data stored in each cell $f_{i,j}$ to the cell $f_{i,j+1}$ when the same character as the (j)the character of the reference character is applied to the input device as a character to be collated, the second transfer circuit operating to transfer data stored in each cell $f_{i,j}$ to the cell $f_{i,j+1}$, regardless of the content of the given character to be collated, the third transfer circuit operating to transfer data stored in each cell $f_{i,j}$ to the cell $f_{i+1,j+1}$ when the same character as the (j)the character of the reference character is not applied to the input device as a character to be collated, and the automatic setting circuit operating to set all the cells in an automatic setting circuit connection direction downstream of a cell having been set, whereby, the cells in a final column output the result of collation.

3 Claims, 11 Drawing Sheets

FIGURE 1A

A B C D
⇓
A B D
DELETION

FIGURE 1B

A B C D
⇓
A B C̄ D
SUBSTITUTION

FIGURE 1C

A B C D
⇓
A B X C D
INSERTION

FIGURE 1D

| DISTANCE | EXAMPLES OF STRING |
|---|---|
| 0 | A B C D |
| 1 | A B D, A B C̄ D, A B X C D |
| 2 | A D, A B̄C̄ D, A X B X C D<br>A C X D, B C̄ D, A B̄ X C D |
| 3 | A, Ā B̄ C̄ D, A X B X C X D<br>A D X, A D̄, A X B̄ X C D |

STRING COLLATING SYSTEM FOR SEARCHING FOR CHARACTER STRING OF ARBITRARY LENGTH WITHIN A GIVEN DISTANCE FROM REFERENCE STRING

This application is a continuation of application Ser. No. 07/426,636, filed Oct. 25, 1989, now abandoned.

BACKGROUND OF THE INVENTION

1. Field of the Invention

The present invention relates to an information retrieval system, and more specifically to a string collating system for searching for a character string of arbitrary length within a given distance from a reference character string.

2. Description of Related Art

At present, character string collating systems have been used for retrieval of text data base, collation of feature sequence in pattern recognition systems, extraction of key words from texts drafted by use of word processors, aid of language translation, address filtering of electronic mail, etc. In other words, the string collating systems are indispensable to current data processing systems.

In the string collating systems, it has been desired to extract or pick up from a plurality of character strings, not only a character string perfectly consistent with a reference string, but also a character string having some degree of similarity in comparison with the reference string. The reason for this is that (1) there is possibility of a text having one or more misspelled words in a text data base retrieval, and (2) retrieval has often to be performed by an uncertain key word. In addition, in the case of collating feature sequences with a reference feature sequence in the pattern recognition, it is a rare case that a feature sequence completely consistent with the reference feature sequence is found. Therefore, it has been required to find out a feature sequence having a highest degree of similarity to a reference feature sequence from a number of feature sequences.

As one means for measuring the degree of similarity between a reference character string and character strings to be collated, the conception called "distance" has been used. This distance means that assuming that a unitary operation is defined by deletion of one character, substitution of one character, or insertion of one character, a distance between two given character strings is defined by a minimum number of unitary operations required for changing one of the two given character strings to the other.

The conception called the "distance" is described in detail in "Approximate String Matching" by Patrick Hall and Geoff Dowling in Computing Surveys, 1980, Vol. 12, No. 4, Page 381.

Figure 1A:
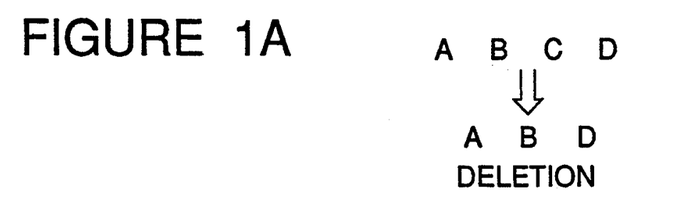
FIGS. 1A, 1B and 1C illustrate examples of a unitary operation such as deletion of one character, substitution of one character, or insertion of one character.
Figure 1B:
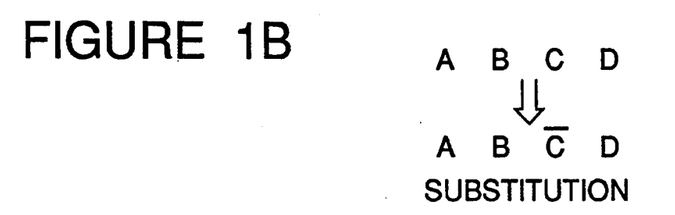
Figure 1C:
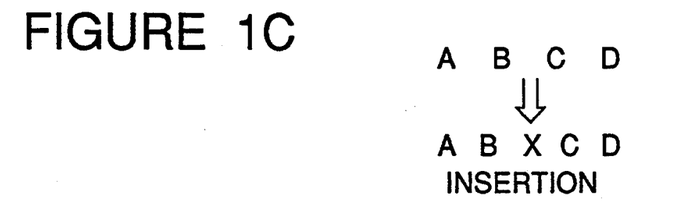

Referring to FIGS. 1A, 1B and 1C, examples of a unitary operation such as deletion of one character, substitution of one character, or insertion of one character, are illustrated. In these Figures, "ABCD" is indicated as an original character string, and three modified strings obtained by performing one unitary operation are shown below each original character string "ABCD". In these figures, "C̄" means any character excluding "C", and "X" means any arbitrary character. In addition, a character having an upper bar and "X" have the same meaning in the following description.

Figure 1D:
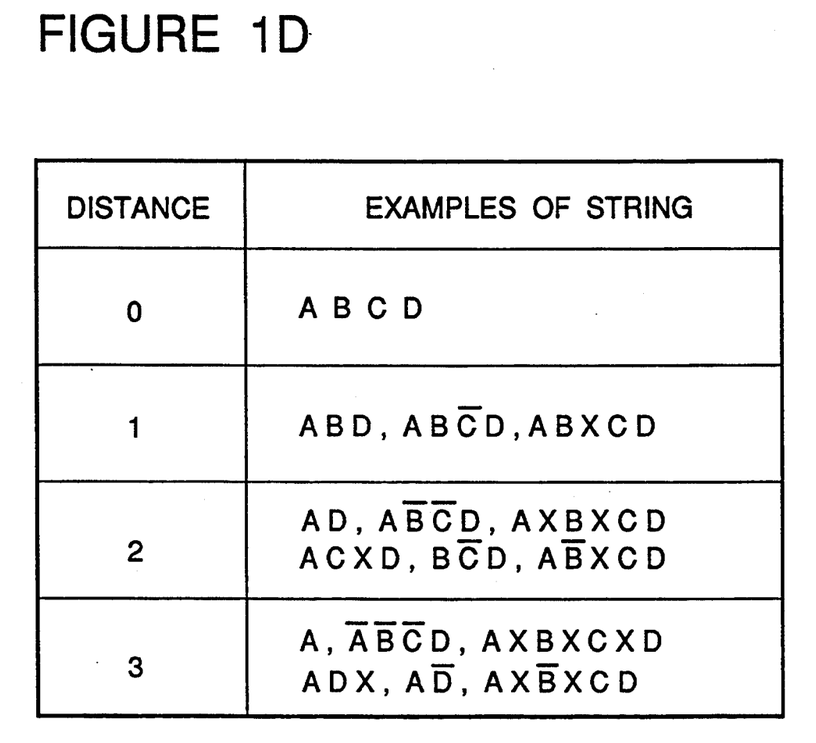
FIG. 1D is a table indicating examples of character strings separate from a character string "ABCD" within an extent of distance "3"

Referring to FIG. 1D, there are shown a table indicating examples of character strings separate from a character string "ABCD" within an extent of distance "3". It will be seen from FIG. 1D that "ABC̄D" is separate from the character string "ABCD" by a distance "1", and therefore, is nearer to the character string "ABCD" than "ACXD" which is separate from the character string "ABCD" by a distance "2".

Japanese Patent Application Laid-open No. 61-95442 and a corresponding European Patent Application laid-open No. 0178651 disclose a character string collating system capable of searching for a character string within an extent of a distance "1" from a reference string. However, the extraction of character strings within an extent of a distance "1" is not sufficient in order to use the character string collating system in a pattern recognition system for voice recognition or handwritten letter recognition. In the voice recognition, for example, a feature sequence extracted from a given voice (the feature sequence corresponds to a string to be collated) involves various fluctuations due to differences in age, the distinction of sex, native place, etc. of a speaker. Therefore, it is a rare case that a feature sequence extracted from a given voice is within an extent of a distance "1" from a template of a prepared feature sequence (corresponding to a reference string). Therefore, in order to use the character string collating system in a pattern recognition system, it is necessary to extract a group of character strings within an extent of a further separate distance, and to select a character string having the nearest distance among the group of extracted character strings. The above mentioned laid-open application has disclosed a string collating system meeting with this requirement.

For example, the string collating system disclosed in above mentioned laid-open application can search for a character string "AXBXCXD" separate from a reference string "ABCD" by a distance "3". However, the string collating system disclosed in above mentioned laid-open application does not take deletion of character (which is one of the unitary operation) into consideration, it cannot search for a character string "AD" separate from a reference string "ABCD" by a distance "2". In other words, the string collating system disclosed in above mentioned laid-open application cannot evenly extract all character strings of different lengths within a predetermined distance from a reference string. It can be said from a different viewpoint that the string collating system disclosed in above mentioned laid-open application cannot extract a character string having a high degree of similarity to a reference string, but often searches for only a character string having a low degree of similarity

SUMMARY OF THE INVENTION

Accordingly, it is an object of the present invention to provide a string collating system which has overcome the above mentioned defect of the conventional one.

Another object of the present invention is to provide a string collating system capable of evenly extracting all character strings of arbitrary lengths within a predetermined distance from a reference string.

The above and other objects of the present invention are achieved in accordance with the present invention by a string collating system comprising an input device receiving a reference string and a string to be collated and for generating a coincidence signal when each constituent of the string to be collated is coincident to one character of the reference string, and a string comparator composed of cells arranged in M columns and in N rows (where M and N are integer), each cell $f_{i,j}$ (i=1 to M-1 and j=1 to N-1) being coupled to a rightward adjacent cell $f_{i,j+1}$ through a first transfer means and also coupled to a downwardly adjacent cell $f_{i+1,j}$ through a second transfer means, each cell $f_{i,j}$ is further coupled to a rightward adjacent cell $f_{i+1,j+1}$ through a third transfer means and also coupled to a rightward adjacent cell $f_{i+1,j+1}$ through an automatic setting means, the cells in a first row being coupled to the input device so as to receive the coincidence signal, The first transfer means operating to transfer data stored in each cell $f_{i,j}$ to the cell $f_{i,j+1}$ when the same character as the (j)th character of the reference character is applied to the input device as a character to be collated, the second transfer means operating to transfer data stored in each cell $f_{i,j}$ to the cell $f_{i+1,j}$ regardless of the content of the given character to be collated, the third transfer means operating to transfer data stored in each cell $f_{i,j}$ to the cell $f_{i+1,j+1}$ when the same character as the (j)th character of the reference character is not applied to the input device as a character to be collated, and the automatic setting means operating to set all the cells in an automatic setting means connection direction downstream of a cell having been set, Whereby, the cells in a final column output the result of collation.

The above and other objects, features and advantages of the present invention will be apparent from the following description of preferred embodiments of the invention with reference to the accompanying drawings.

DESCRIPTION OF THE PREFERRED EMBODIMENTS

Figure 2:
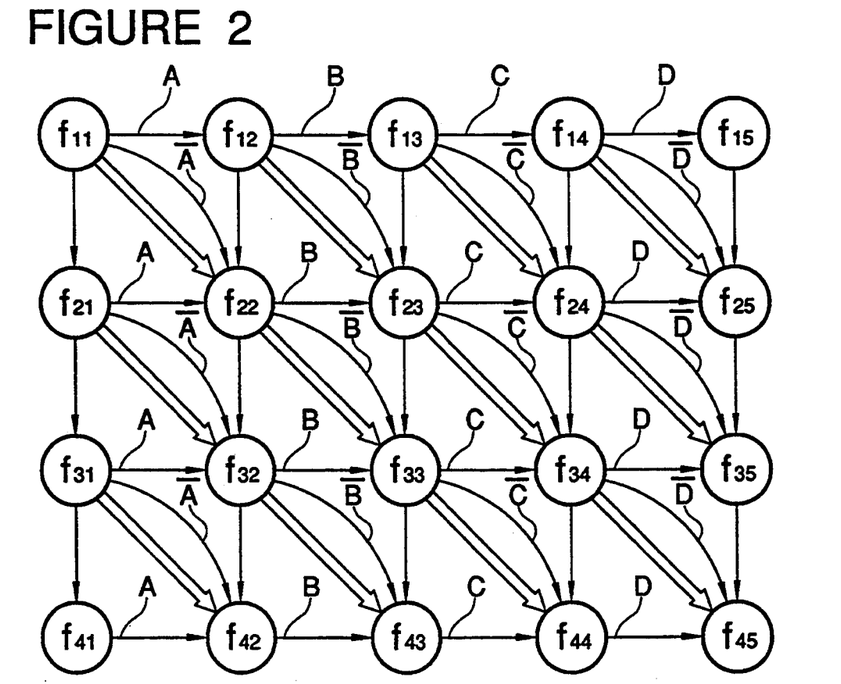
FIG. 2 is a conceptual diagram illustrating a principle of the string collating method in accordance with the present invention.

Referring to FIG. 2, there is shown a conceptual diagram illustrating a principle of the string collating method in accordance with the present invention. The shown example illustrates a case in which a string collation is performed for a reference string "ABCD" by using a cell array having four rows and five columns. As will be seen from the following description, the shown cell array can extract strings of arbitrary lengths within an extent of distance "3" from the reference string "ABCD".

In FIG. 2, each circle designates one cell given the Reference Character $f_{i,j}$ (where i=1 to 4 and j=1 to 5). Each cell $f_{i,j}$ is coupled to a rightward adjacent cell $f_{i,j+1}$ through a first transfer means indicated by a solid line arrow which rightward extends in a row direction and which is given A, B, C or D. In addition, each cell $f_{i,j}$ is coupled to a downwardly adjacent cell $f_{i+1,j}$ through a second transfer means indicated by a solid line arrow which downwardly extends in a column direction. Each cell $f_{i,j}$ is also coupled to a rightward adjacent cell $f_{i+1,j+1}$ through a third transfer means indicated by a solid arced line arrow which right-downwardly extends in an orthogonal direction and which is given $\overline{A}, \overline{B}, \overline{C}$ or $\overline{D}$. Furthermore, each cell $f_{i,j}$ is coupled to a rightward adjacent cell $f_{i+1,j+1}$ through an automatic setting means indicated by a solid doubled line arrow which right-downwardly extends in an orthogonal direction.

In the above mentioned cell array, the first and third transfer means operate to transfer data stored in one cell to another cell in accordance with the direction of each arrow only when a character (to be collated) indicated for each arrow is given to the one cell. On the other hand, the second transfer means operates to transfer data stored in one cell to another cell in accordance with the direction of each arrow when a character to be collated is given to the one cell, regardless of the content of the given character to be collated.

Although not shown in FIG. 2, each cell has an input means for receiving data fed through the respective transfer means, and each cell stores data "1" when data "1" is supplied to the cell through at least one of all transfer means coupled to the cell. On the other hand, each cell stores data "0" when data "1" is not supplied to the cell through anyone of all transfer means coupled to the cell.

The automatic setting means is one feature of the present invention. If one cell stores the data "1", all cells orthogonally downstream of the one cell having stored the data "1" in the direction of the doubled line arrow are set to store the data "1", regardless of data given to the input means of each of the orthogonally downstream cell. For example, if the cell $f_{12}$ stores the data "1", the cell $f_{23}, f_{34}$ and $f_{45}$ are simultaneously set to store the data "1". If the cell $f_{22}$ stores the data "1", the cell $f_{33}$ and $f_{44}$ simultaneously set to store the data "1".

With the above mentioned arrangement of cell array, a result of collation can be obtained by reading the data stored in cells of a fifth column.

Now, an operation of the cell array shown in FIG. 2 will be explained with reference to FIGS. 3 and 4A to 4H.

Each of FIGS. 3 and 4A to 4H shows the same cell structure as that shown in FIG. 2, but for simplification of drawings, the Reference Characters to be given to the cells are omitted. Therefore, a cell shown in FIG. 3 and FIGS. 4A to 4H should be deemed to be given the same Reference Character as that given to the cell located at a corresponding position in FIG. 2. In addition, a hatched cell indicates that the cell stores data "1", and a blanked or white cell indicates that the cell stores data "0".

Figure 3:
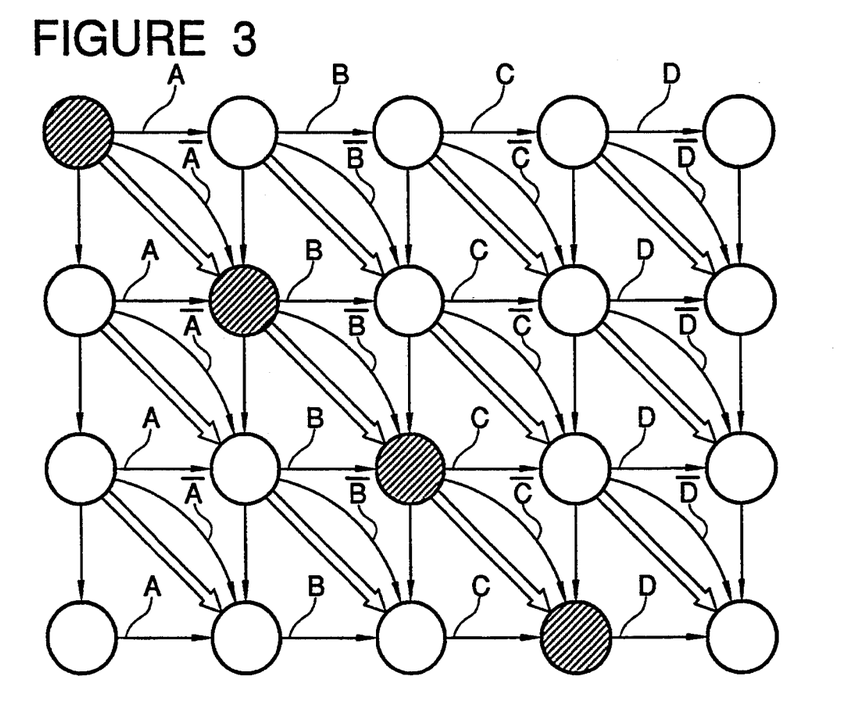
FIG. 3 shows an initial condition of the cell array shown in FIG. 2 before a collation operation is started.

FIG. 3 shows an initial condition of the cell array before a collation operation is started. In the shown initial condition, the cell $f_{11}$ is set to store data "1", and therefore, the cells $f_{22}$, $f_{33}$ and $f_{44}$ are automatically set to store the data "1" by means of the automatic setting means. The other cells are set to store data "0".

FIGS. 4A to 4D illustrate a string collating procedure or sequence for comparing a character string "ABCD" with a reference string "ABCD" in the named order of A, B, C and D. FIG. 4A to 4D shows conditions at each time one character is inputted. The condition shown in each of FIG. 4A to 4D indicates a result of collation between the reference string "ABCD" and characters which have been inputted from the start of one collation operation until a character is newly inputted in the figure concerned. The data stored in the cells of the fifth column represents the result of collation. Namely, among the cells included in the fifth column and storing the data "1", the cell positioned at a row having a minimum row number is found out. If the found-out cell is the cell $f_{15}$, the distance between the reference string and the string to be collated is "0". If the found-out cell is the cell $f_{25}$, the distance is "1". The cell $f_{35}$ shows the distance "2", and the cell $f_{45}$ indicates the distance "3". If no cell storing the data "1" is found out in the fifth column, the distance between the reference string and the string to be collated is considered to be not less than "4".

Figure 4A:
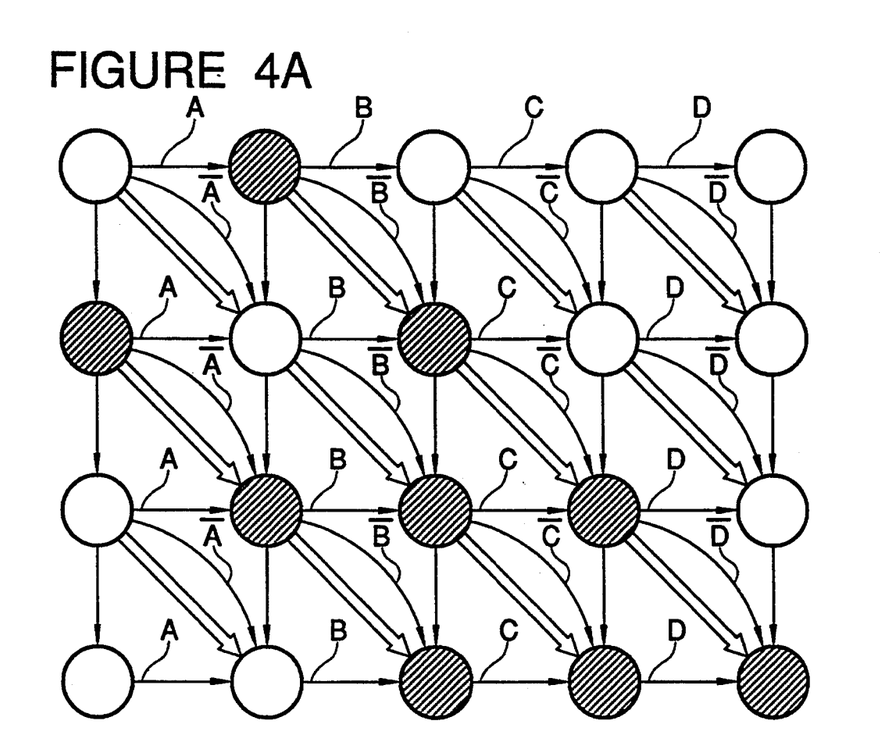
FIGS. 4A, 4B, 4C to 4D illustrate a string collating procedure or sequence for comparing a character string "ABCD" with a reference string "ABCD"

Now, if a character "A" to be collated is inputted to the cell array maintained in the initial condition shown in FIG. 3, the cell array is changed from the condition shown in FIG. 3 to the condition shown in FIG. 4A. Namely, the data "1" in the cell $f_{11}$ is transferred to the cells $f_{12}$ and $f_{21}$ and therefore, the data "1" is set to the cells $f_{12}$, $f_{23}$, $f_{34}$ and $f_{45}$ and the cells $f_{32}$ and $f_{43}$. As mentioned hereinbefore, the condition shown in FIG. 4A represents a result of collation between the reference string "ABCD" and a character "A" of the string "ABCD" to be collated, as an intermediate result of the collation operation for the string "ABCD" to be collated. As seen from the drawing, the cell $f_{45}$ in the fifth column is set to "1". This means that "A" is separate from "ABCD" by the distance "3".

Figure 4B:
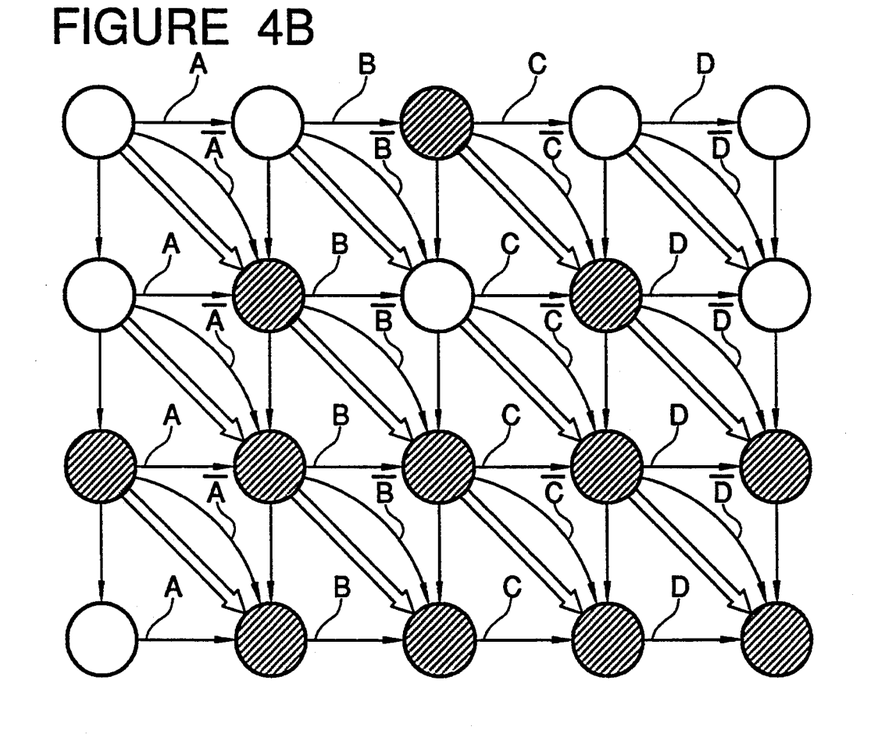

Next, a character "B" to be collated is inputted to the cell array, and as a result, the cell array is changed from the condition shown in FIG. 4A to the condition shown in FIG. 4B. Namely, the condition shown in FIG. 4B represents a result of collation between the reference string "ABCD" and a characters "AB" of the string "ABCD" to be collated. The cell $f_{35}$ in the fifth column is set to "1". This means that "AB" is separate from "ABCD" by the distance "2".

Figure 4C:
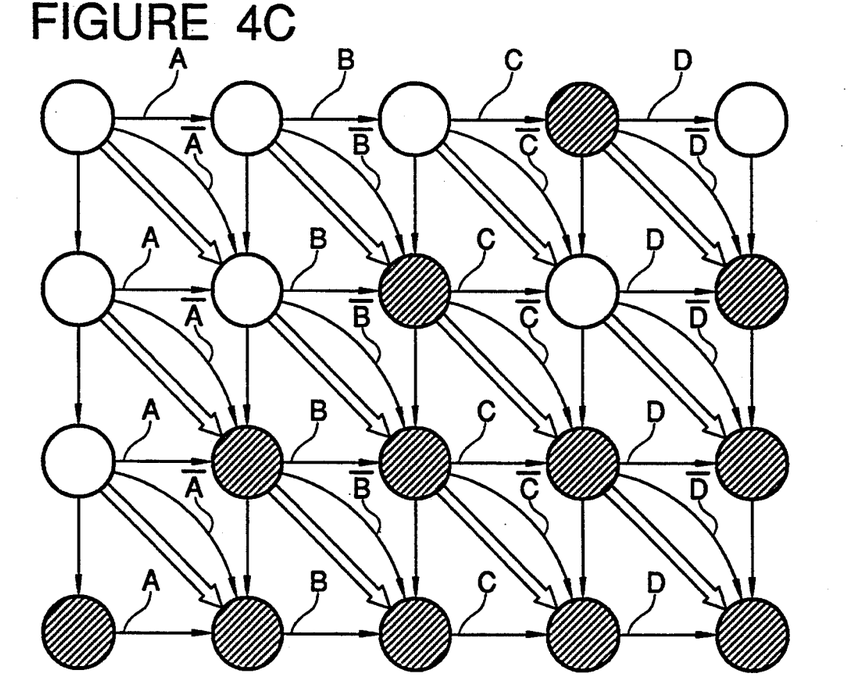

Then, a character "C" to be collated is inputted to the cell array, and as a result, the cell array is changed from the condition shown in FIG. 4B to the condition shown in FIG. 4C. The condition shown in FIG. 4C represents a result of collation between the reference string "ABCD" and a characters "ABC" of the string "ABCD" to be collated. The cell $f_{25}$ in the fifth column is set to "1". This means that "ABC" is separate from "ABCD" by the distance "1".

Figure 4D:
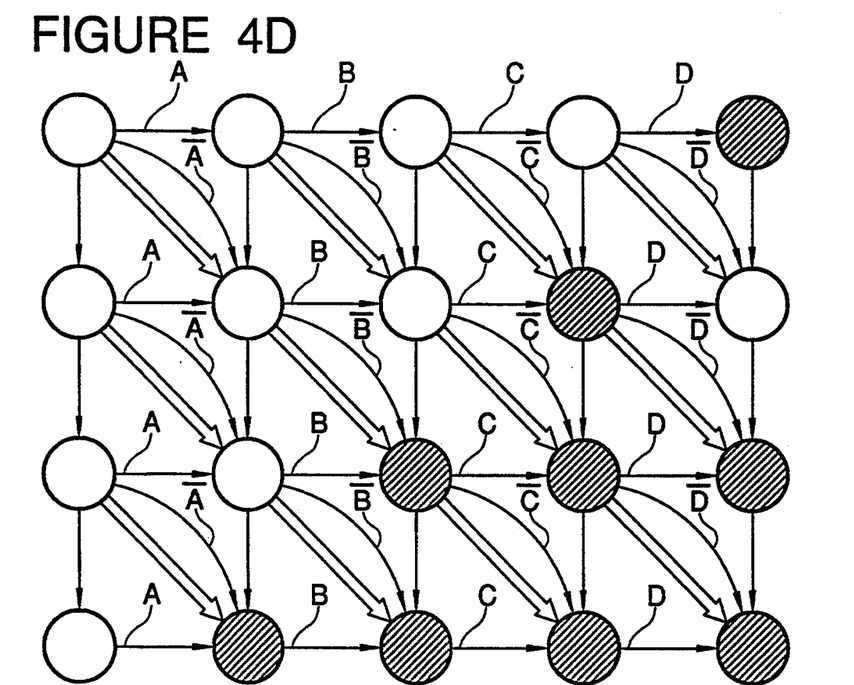

Finally, a character "D" to be collated is inputted to the cell array, and as a result, the cell array is changed from the condition shown in FIG. 4C to the condition shown in FIG. 4D. The condition shown in FIG. 4D represents a result of collation between the reference string "ABCD" and the string "ABCD" to be collated. The cell $f_{15}$ in the fifth column is set to "1". This means that "ABCD" is separate from "ABCD" by the distance "0".

As seen from the above, by inputting, one by one, constituents of the string "ABCD" to be collated to the cell array, the intermediate results and the final result of the collation operation can be sequentially obtained. The result thus obtained indicates a correct distance between the reference string and the string to be collated. The reason for this is that the character "A" to be collated corresponds to one that is obtained by executing the deletion of one character (unitary operation) for "ABCD" three times, and the characters "AB", "ABC" and "ABCD" to be collated respectively corresponds to ones that are obtained by executing the deletion of one character for "ABCD" two times, one time or zero time, respectively.

Figure 4E:
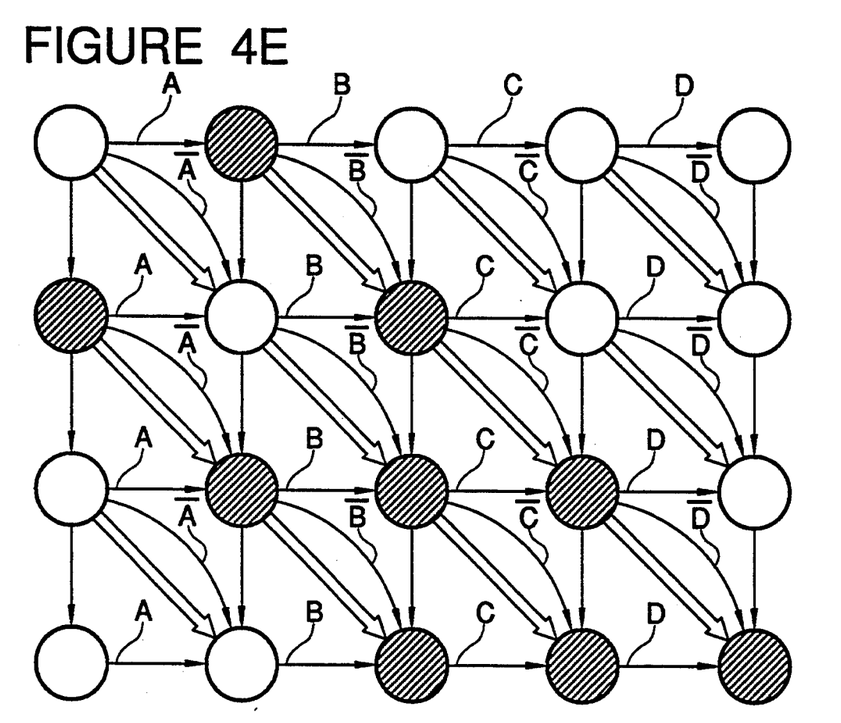
FIGS. 4E, 4F, 4G, 4H illustrate a string collating procedure or sequence for comparing a character string "ABCD" with a reference string "ACXD"
Figure 4F:
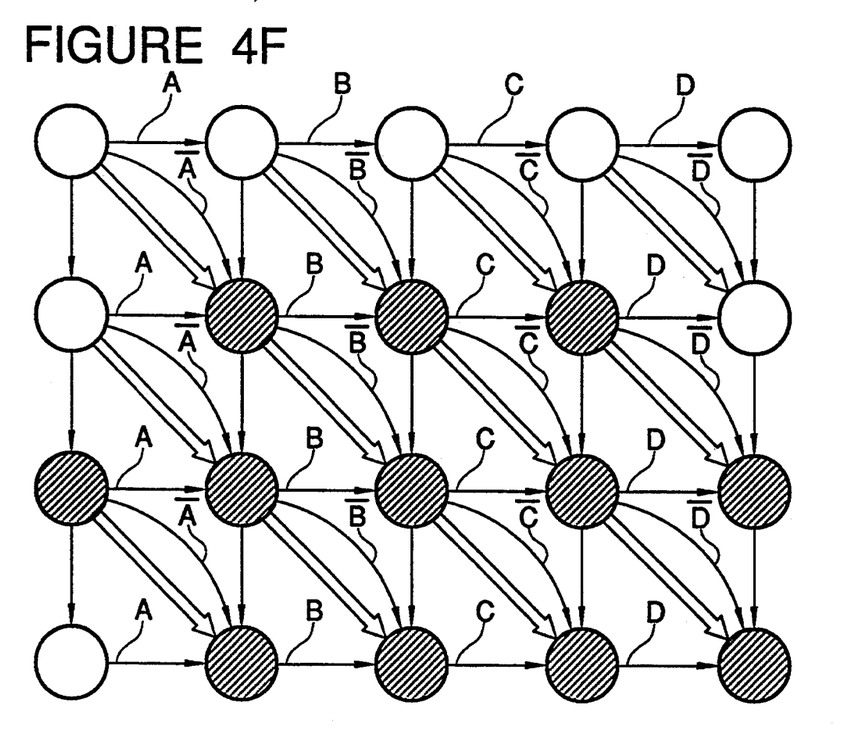
Figure 4G:
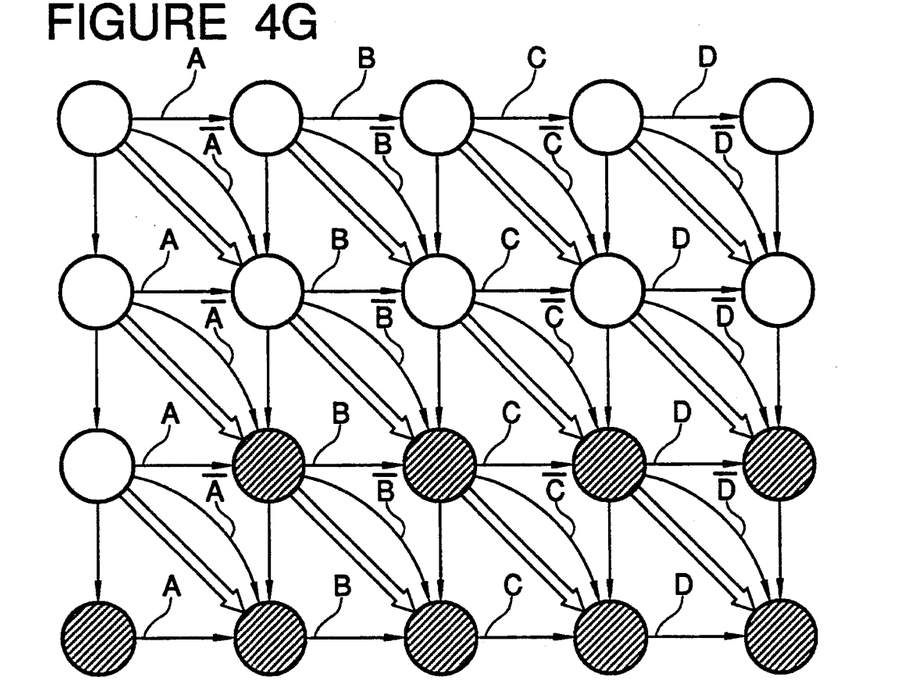
Figure 4H:
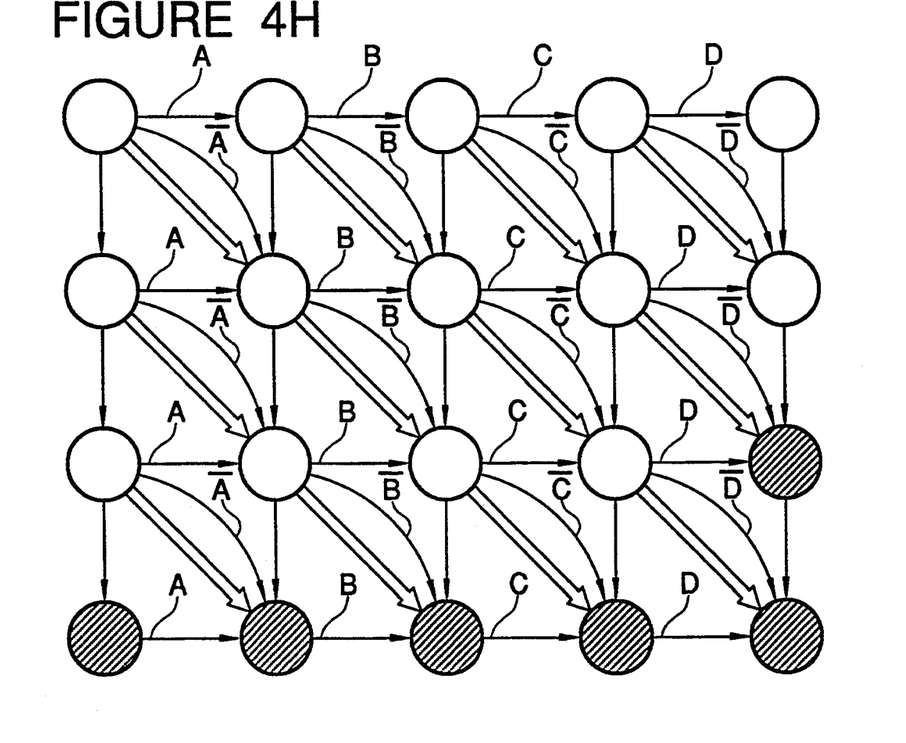

FIGS. 4E to 4H correspond to FIG. 4A to 4D, respectively, but show a case in which a character string "ACXD" is collated under the same condition as that of the example shown in FIG. 4A to 4D. In brief, FIG. 4E shows that a character "A" to be collated is separate from the reference string "ABCD" by a distance "3". FIGS. 4F, 4G and 4H respectively show that character strings "AC", "ACX" and "ACXD" are separate from the reference string "ABCD" by a distance "2", respectively. It would be apparent that the results of collation shown in these figures respectively indicate correct distances between the reference string and the respective strings to be collated.

As will be apparent from the above description, the cell array having the structure shown in FIG. 2 can discriminate whether or not a given string to be collated is within an extent of a distance "3" fron the reference string, "ABCD". Therefore, if a plurality of strings to be collated are sequentially inputted to the cell array, it is possible to extract all strings of arbitrary length within the extent of the distance "3" from the reference string, "ABCD". Therefore, it is possible to perform a collation operation on the basis of a reference string of arbitrary length by modifying the cell array so as to have the number of columns corresponding to the length of the reference string and the number of rows corresponding to a maximum distance to be detected.

Figure 5:
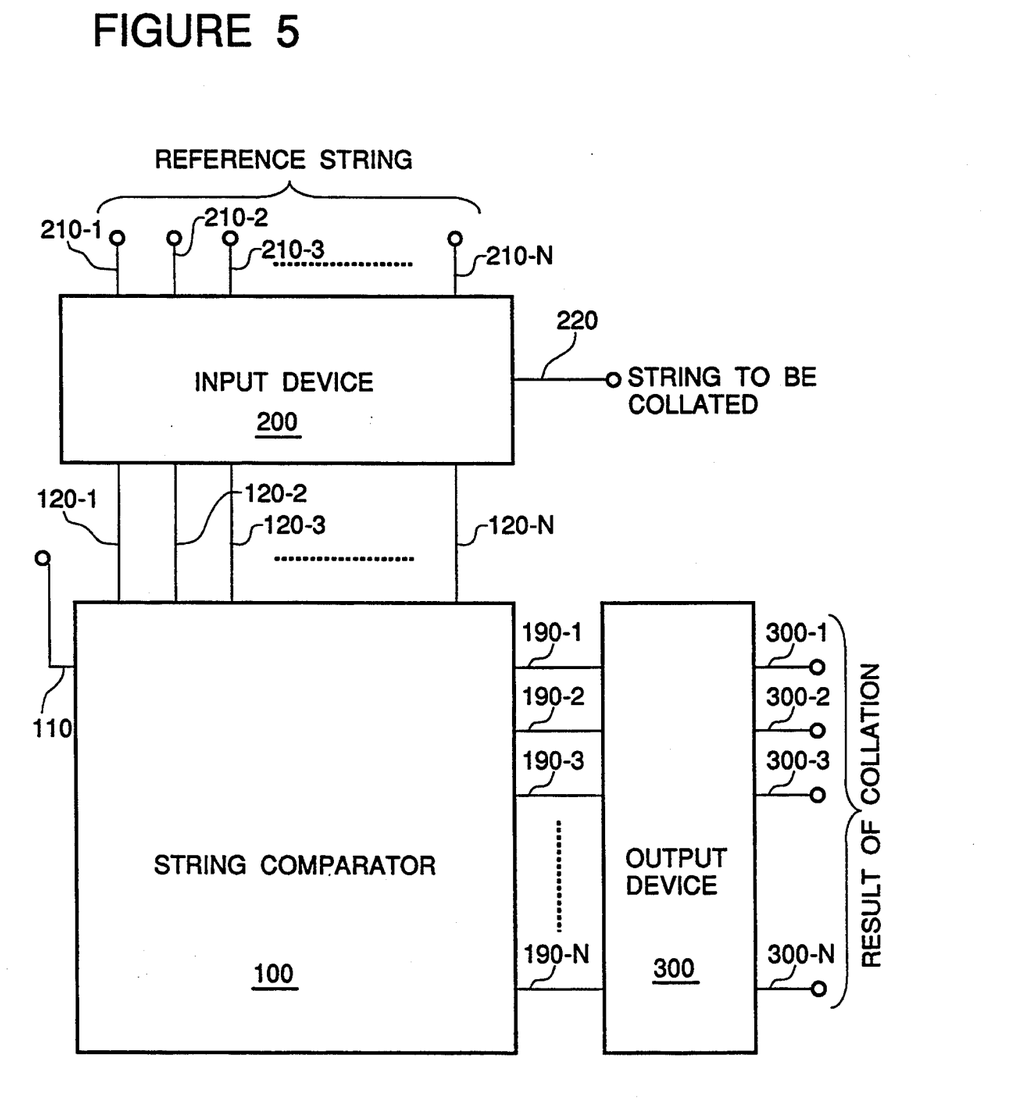
FIG. 5 is a block diagram of an embodiment of the string collating system in accordance with the present invention.

Referring to FIG. 5, there is shown a block diagram of an embodiment of the string collating system in accordance with the present invention. The shown system includes a string comparator 100, an input device 200, and an output device 300 coupled to each other as shown.

Figure 6:
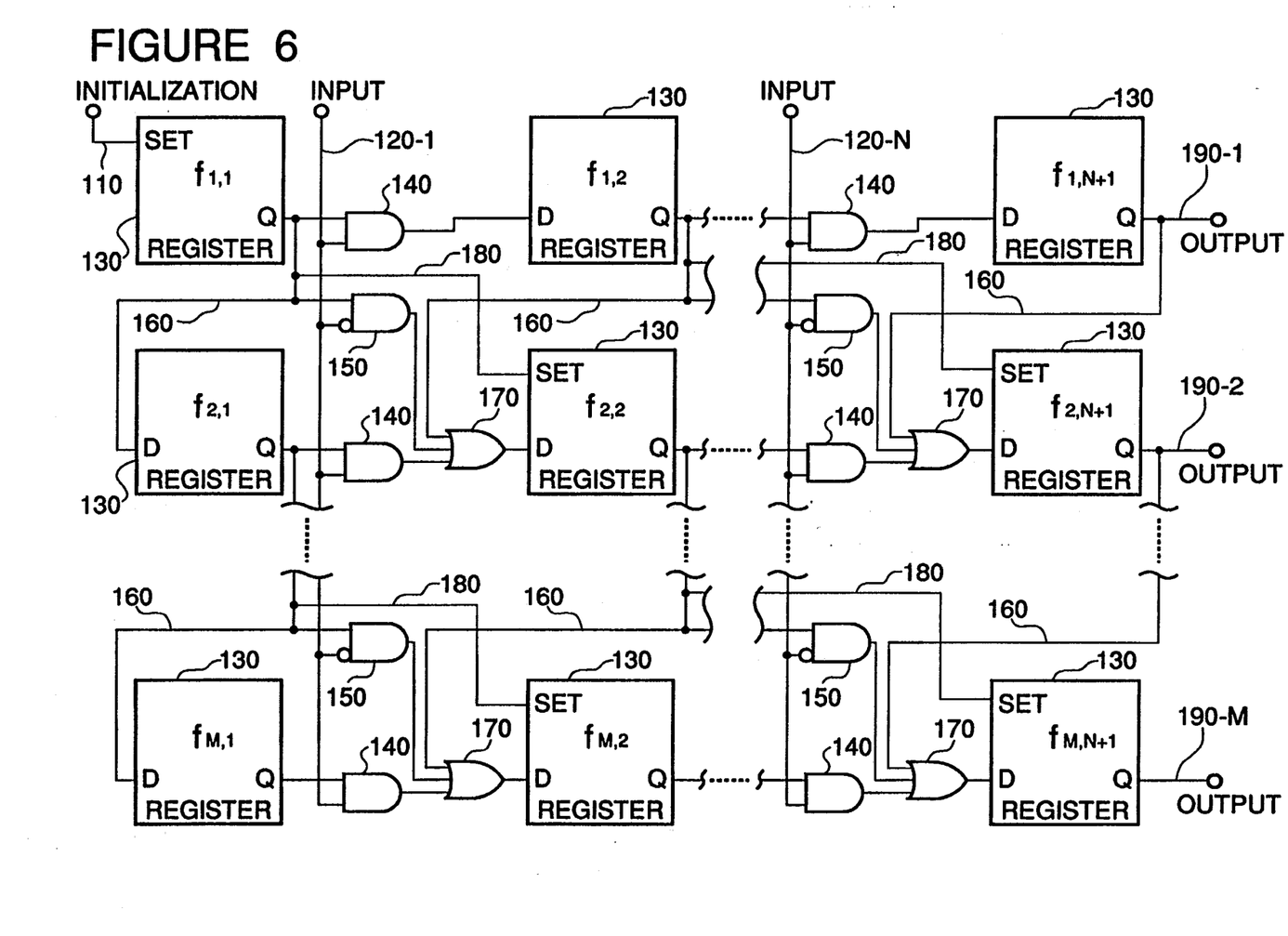
FIG. 6 is a block diagram of one example of the string comparator provided in the string collating system shown in FIG. 5.

As shown in FIG. 6, the string comparator 100 comprises a set terminal 100, N input terminals 120-j (where N is integer and j=1 to N) and a matrix of one-bit registers 130 having M rows and (N+1) columns (where M is integer). Each of the registers 130 has a data input terminal D, a data output terminal Q and a set terminal SET for setting the data output terminal Q to "1". The data output terminal Q of the register 130 ($f_{ij}$) positioned at a (i)th row (i=1 to M) and a (j)th column (j=1 to N) is connected to one input of a first AND gate 140, which in turn has another input connected to the input terminal 120-j and an output connected to the data input terminal D of the register 130 ($f_{i,j+1}$) positioned at the same (i)th row and at a next (j+1)th column, directly in the case of i=1 or through an OR gate 170 in the case of i=2 to N. The data output terminal Q of the register 130 ($f_{ij}$) positioned at a (i)th row and a (j)th column is also connected to one input of a second AND gate 150, which in turn has another inverted input connected to the input terminal 120-j and an output connected through a corresponding OR gate 170 to the data input terminal D of the register 130($f_{i+1,j+1}$) positioned at a next (i+1)th row and at a next (j+1)th column.

In addition, the data output terminal Q of the register 130 ($f_{ij}$) positioned at a (i)th row and a (j)th column is connected through a corresponding transfer line 160 to the data input terminal D of the register 130 ($f_{i+1,j}$) positioned at a next (i+1)th row and at the same (j)th column, directly in the case of j=1 of through a corresponding OR gate 170 in the case of j=2 to N+1. The data output terminal Q of the register 130 ($f_{ij}$) positioned at a (i)th row and a (j)th column is also connected through a corresponding transfer line 180 to the set terminal SET of the register 130 ($f_{i+1,j+1}$) positioned at a next (i+1)th row and at a next (j+1)th column. The data output terminals D of the registers 130 ($f_{i,N+1}$) in the (N+1)th column are connected to output terminals 190-j, respectively.

In the above mentioned matrix of registers, each register 130 ($f_{ij}$) corresponds to the cell $f_{ij}$ shown in FIG. 2. The first AND gate 140, the second AND gate 150 and the transfer line 160 correspond to the first, second and third transfer means shown in FIG. 2, respectively. The OR gate 170 constitutes the input means of each cell $f_{ij}$ shown in FIG. 2. The transfer line 180 provides for the setting means shown in FIG. 2.

In addition, when a (j)th character of a reference character string is consistent with a character to be collated, data "1" is supplied from the input device 200 to the input terminal 120-j.

If the (j)th character of the reference string is not consistent with a character to be collated, data "0" is supplied to the input terminal 120-j. Therefore, only when the (j)th character of the reference string is consistent with a character to be collated, the first AND gate 140 operates to transfer the content of the register $f_{ij}$ 130 to the register $f_{i,j+1}$ 130. Otherwise, the first AND gate 140 operates to output the data "0". On the other hand, the AND gate 150 operates to transfer the content of the register $f_{ij}$ 130 to the register $f_{i+1,j+1}$ 130 only when the (j)th character of the reference string is not consistent with a character to be collated. If the (j)th character of the reference string is consistent with a character to be collated, the second AND gate 150 operates to output the data "0". From these functions of the AND gates 140 and 150, it would be understood that the first AND gate 140 and the second AND gate 150 correspond to the first transfer means and the second transfer means shown in FIG. 2, respectively.

Figure 7:
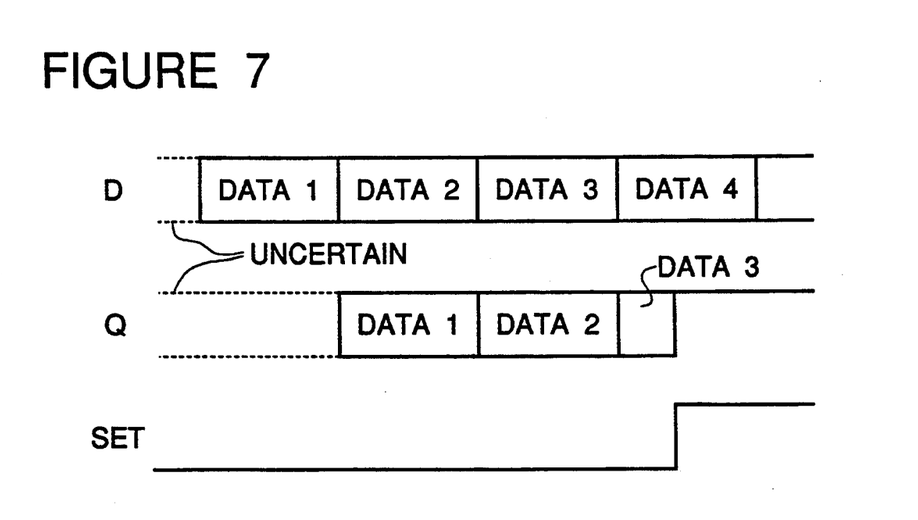
FIG. 7 is a waveform diagram illustrating the relation between an input and an output of the register provided in the string comparator shown in FIG. 6.

Referring to FIG. 7, there is shown a waveform diagram illustrating the change of the data output terminal Q of each register 130 provided in the string comparator shown in FIG. 6, in response to a signal applied to the data input terminal D and in response to a level at the set terminal SET. As seen from FIG. 7, if the set terminal SET of the register 130 is at "0", the register 130 operates to output from its output terminal Q the data applied to the data input D after a delay of one period. However, if the set terminal SET is brought to "1", the register 130 operates to output "1" from its output terminal Q regardless of data applied to the data input D. Each register having the above mentioned function can be formed of a master-slave flipflop having a set terminal.

Figure 8:
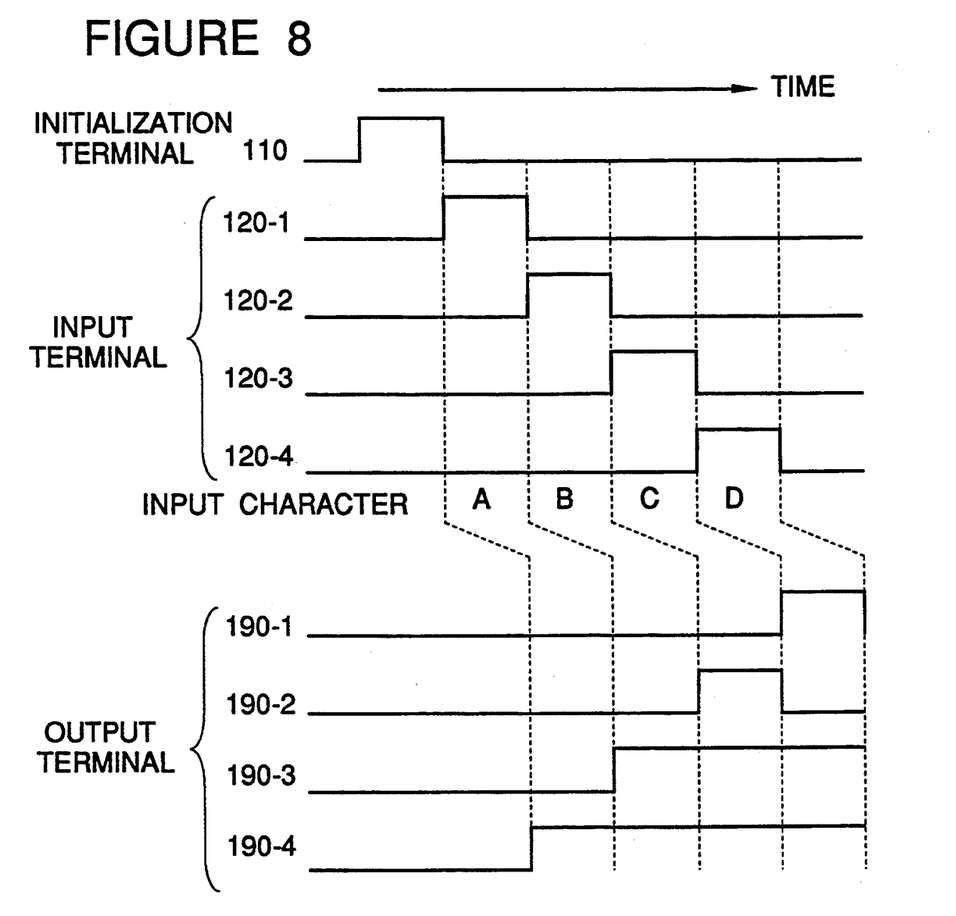
FIG. 8 is a timing chart illustrating an operation of the string comparator shown in FIG. 6.

FIG. 8 is a timing chart illustrating an operation of the string comparator shown in FIG. 6 under assumption of N=M=4 corresponding to the cell array shown in FIG. 2, and in the case that a string "ABCD" to be collated is compared with a reference string "ABCD". More specifically, FIG. 8 illustrates the level change at the initialization terminal 110, the input terminals 120-1 to 120-4 and the output terminals 190-1 to 190-4.

Recalling the operation of the cell array shown in FIG. 2, an operation of the register matrix shown in FIG. 6 will now be described with reference to FIGS. 7 and 8.

First of all, in order to attain the initial condition as shown in FIG. 3, it is necessary to previously reset the content of all the registers 130 to "0". This condition can be realized by providing a reset terminal for each register 130 and activating the reset terminal of all the registers 130, or by continuously supplying the data "0" to all the input terminals 120-1 to 120-4 until the contents of all the registers 130 are brought to "0".

Then, "1" is given to the initialization terminal 110, so that only the registers 130 $f_{11}$, $f_{22}$, $f_{33}$ and $f_{44}$ are set to "1". This condition corresponds to the initial condition as shown in FIG. 3.

Thereafter, "1" is inputted to only the input terminal 120-1 and "0" is inputted to the other input terminals (this corresponds to inputting of a character "A"). After delay of one period, "1" is outputted from only the output terminal 190-4 and "0" is outputted from the other terminals. This condition corresponds to the condition of the cells in the Nth column of the cell array shown in FIG. 4A. Then, input signal patterns respectively corresponding to "B", "C" and "D" are sequentially inputted to the input terminals 120-1 to 120-4, and the output terminals 190-1 to 190-4 sequentially generate output signal patterns respectively corresponding to the conditions of the cells in the Nth column of the cell array shown in FIGS. 4B, 4C and 4D. Thus, the result of collation between the reference string "ABCD" and strings "A", "AB" and "ABC" to be collated can be obtained from the output terminals 190-1 to 190-4 in the way of the collating operation, and the result of collation between the reference string "ABCD" and the string "ABCD" can be obtained from the output terminals 190-1 to 190-4 as the final result of the collating operation.

As seen from the above, it is necessary to supply the input terminals 120-1 to 120-4 with a coincidence signal between the reference string and each character to be collated. In addition, since the result of collation cannot be readily known from the output signals of the output terminals 190-1 to 190-4, it is necessary to convert the output signals of the output terminals 190-1 to 190-4 into a signal straightly indicating the result of collation.

Figure 9:
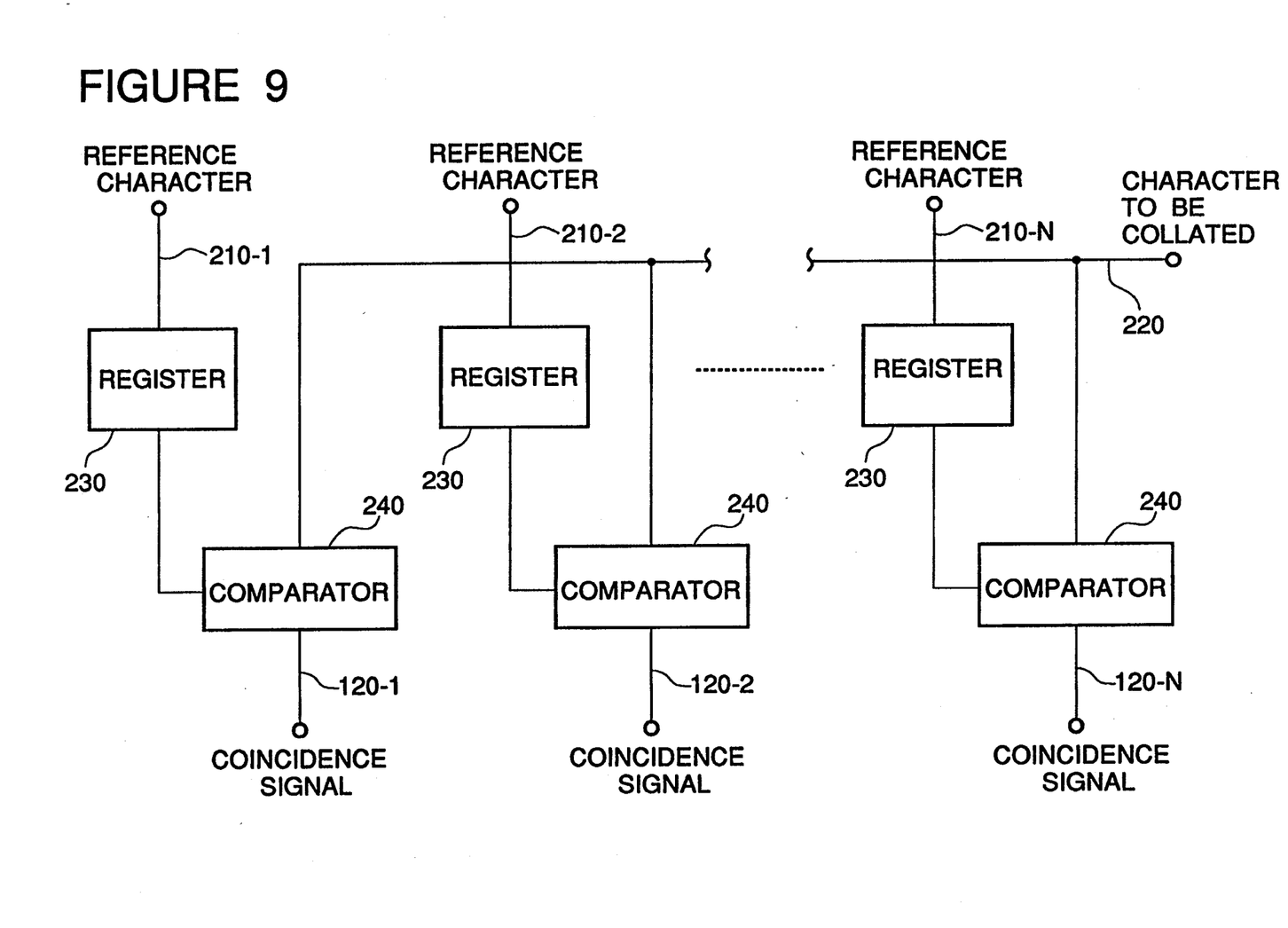
FIG. 9 is a block diagram of one example of the input device provided in the string collating system shown in FIG. 5.

Referring to FIG. 9, there is shown a block diagram of one example of the input device provided in the string collating system shown in FIG. 5. The shown input device has N reference character input terminals 210-1 to 210-N for receiving in parallel all characters of a reference string, and a collation character input terminal 220 for sequentially receiving characters of a string to be collated, one by one. The input terminals 210-1 to 210-N are connected to N registers 230 in a one-to-one relation. An output of each register 230 is connected to one input of a corresponding comparator 240, which in turn has another input connected commonly to the collation character input terminal 220. An output of each comparator 240 is connected to a corresponding one of the input terminals 120-1 to 120-N of the string comparator 100.

With the above mentioned arrangement, all characters of a reference string are first registered to the corresponding registers 230 through the reference character input terminals 210-1 to 210-N, respectively. Therefore, characters of a string to be collated are sequentially supplied, one by one, through the collation character input terminal 220. Each time one character of a string to be collated is supplied through the collation character input terminal 220, each of the comparators 240 compares the one character supplied through the collation character input terminal 220 with the content of the corresponding register 230, and outputs "1" if both are coincident and "0" if both are different.

In the above mentioned example, it has been assumed that one character is formed of one bit. In this connection, it would be apparent that even if one character is formed of a plurality of bits, the input device can be formed in a similar manner.

Figure 10:
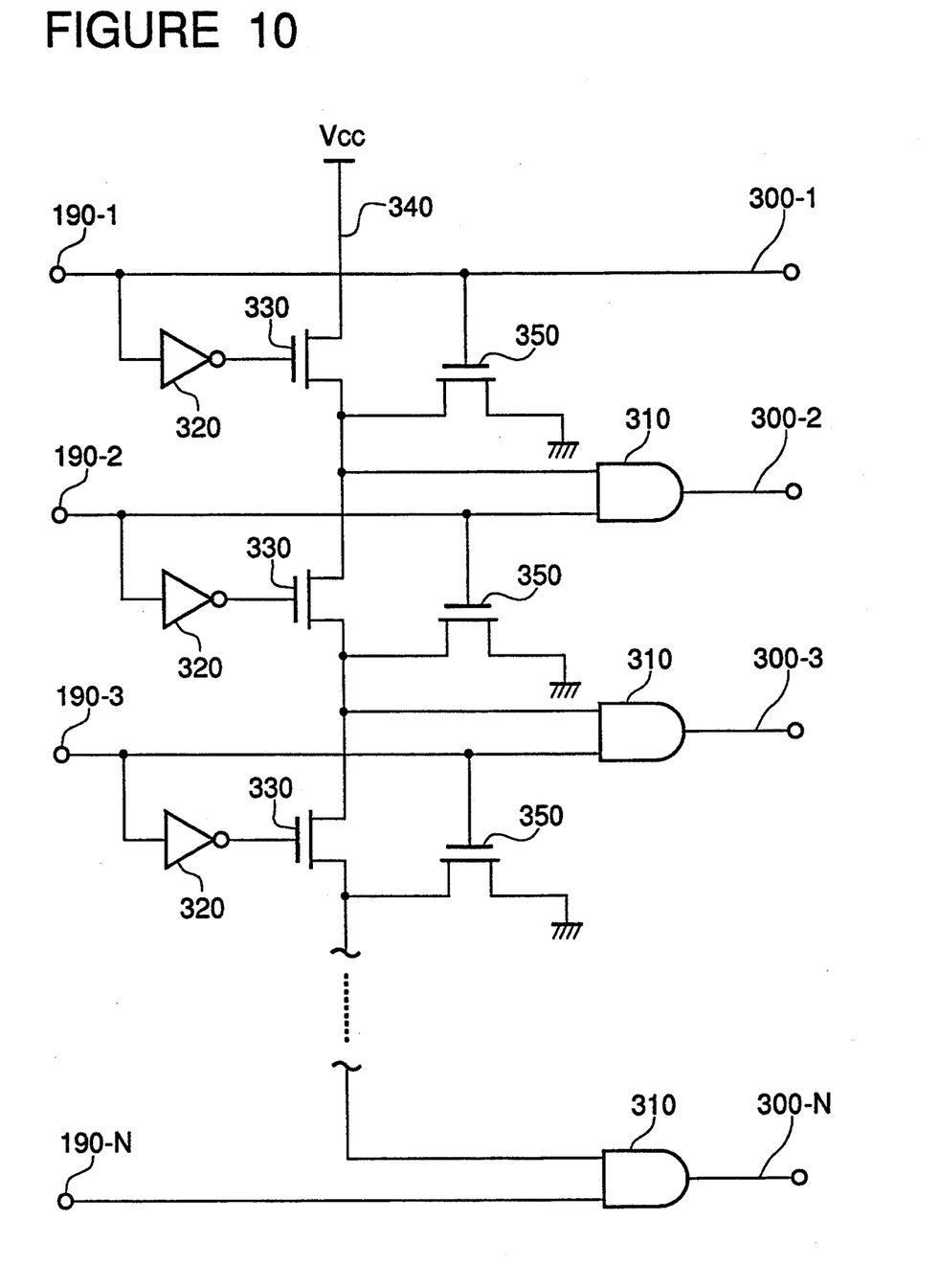
FIG. 10 is a block diagram of one example of the output device provided in the string collating system shown in FIG. 5.

Turning to FIG. 10, there is shown a block diagram of one example of the output device provided in the string collating system shown in FIG. 5. In this output device 300, the output terminal 190-1 of the string comparator 100 is connected directly to a collation result output terminal 300-1, and the output terminals 190-2 to 190-N of the string comparator 100 are connected to one input of corresponding AND gates 310, whose outputs are connected to collation result output terminals 300-2 to 300-N, respectively. In addition, the output terminals 190-1 to 190-N-1 are connected to inverters 320 in a one-to-one relation. On the other hand, NMOS path transistors 330 are connected in series between a voltage supply terminal Vcc, 340 and the other input of the AND gate 310 connected to the output terminal 300-N. An output of each inverter 320 is connected to a gate of a corresponding one of the series connected NMOS path transistors 330. Furthermore, there are provided (N-1) source-grounded NMOS pull-down transistors 350 having a gate connected to a corresponding one of the output terminals 190-1 to 190-N-1 of the string comparator 100 and a drain connected to a corresponding one of series connection nodes of the series connected NMOS path transistors 330. The series connection nodes of the series connected NMOS path transistors 330 are connected to a second input of a corresponding AND gates 310, respectively.

The circuit shown in FIG. 10 is well known, and therefore, a detailed description will be omitted. In brief, if signals applied from the output terminals 190-1 to 190-N of the string comparator 100 includes two or more "1"s, "1" is outputted from only the output terminal 300-i corresponding to the terminal 190-i having a lowest row number among the terminals 190-i outputting the data "1", and "0" is outputted from the other output terminal 300-i. If only one of the output terminals 190-1 to 190-N of the string comparator 100 outputs "1", "1" is outputted from the output terminal 300-i corresponding to the terminal 190-i outputting the data "1", and "0" is outputted from the other output terminal 300-i. With this, if the output terminal 300-i outputs "1", it will be readily understood that the result of collation means the distance of "i-1".

As seen from the above mentioned description of the embodiment with reference to the accompanying drawings, the string collating system in accordance with the present invention comprises a string comparator composed of a cell array in which cells are interconnected by the transfer means and the automatic set means. The interconnection of cells by the automatic set means is one important feature of the present invention.

In the cell array thus formed, firstly, the interconnection of cells is limited to the interconnection of adjacent cells in a localized area. Namely, remote cells are not interconnected. Secondly, the interconnection of cells is regular, and the cells are interconnected in the same pattern anywhere within the cell array.

The cell array having the above advantages makes it possible (a) to construct a string collating system capable of performing collation of a string of arbitrary length, (b) to construct a "simple" string collating system capable of complying an arbitrary collation distance, (c) to easily change a length of a reference string and a collation distance, and (d) to shorten a time for designing an integrated circuit for a string collating system and to integrate the string collating system in a reduce chip area.

The above mentioned advantages (a) and (b) means that the length N of the reference string and the collation distance M can be easily changed only by modifying the column number and the row number. The hardware amount of the string collation cell array in accordance with the present invention is in proportion to the product of N×M. However, even if N and/or M is increased, the string collation cell array never becomes suddenly complicated. This feature is given by the above mentioned first and second advantages, namely, the localization of the interconnection of cells and the regularity of the interconnection of adjacent cells.

The above mentioned advantage (c) means that a long reference string or a long collation distance which cannot be handled by a single string collating system can be easily handled by simply coupling a required number of string collating systems of the present invention in a row direction or in a column direction. This feature is also given by the above mentioned first and second advantages. In actual applications, since reference string length and/or a long collation distance would not be fixed, this flexibility is indispensable to the string collating systems.

The above mentioned advantage (d) gives a high degree of utility to the present invention. In the case that a circuit is assembled on an integrated circuit, a regular construction of circuit will make it possible to shorten the design time and reduce the required chip area. The above mentioned second advantage, namely, the regularity of the interconnection of adjacent cells, is very convenient to the assemble into an integrated circuit, and the first advantage, namely, the localization of the interconnection of cells, can shorten the length of required wiring.

As seen from the above, the string collation system in accordance with the present invention has a high degree of function, a high degree of flexibility and a high degree of utility.

In the above mentioned embodiment, the registers 130 have been formed of a master-slave flipflop. However, the registers can be formed of any circuit that fulfills the input and output conditions shown in FIG. 7. In addition, the first and second transfer means have been composed of the AND gates 140 and 150, respectively. However, these transfer means may be of any circuit that has a switching function to open or close dependent upon whether or not a character to be collated is consistent with a reference character.

Furthermore, in the waveform diagram shown in FIG. 8, after an input of a signal has been completed, an output signal will appear on a corresponding output. However, the circuit may be such that an output signal will appear on a corresponding output before an input of a signal has been completed.

In any case, it should be noted that the present invention is in no way limited to the details of the illustrated structures but changes and modifications may be made within the scope of the appended claims.

I claim:

1. A character string collating system comprising:
   an input device receiving a reference character string in a parallel form and serially receiving a character string to be collated, in order and character by character, said input device generating a coincidence signal for each constituent character of said reference character string when a serially received character of said character string to be collated is coincident to a corresponding constituent character of said reference character string; and
   a character string comparator composed of cells arranged in the form of a matrix having M columns and N rows (where M and N are integers), the cells in each column being coupled to said input device so as to receive the coincidence signal for a corresponding constituent character of said reference character string;
   each cell $f_{i,j}$ (i=1 to M-1 and j=1 to N-1) being coupled to a rightward adjacent cell $f_{i,j+1}$ through a first transfer means which operates to transfer data stored in the cell $f_{i,j}$ to said cell $f_{i,j+1}$ when the same character as the (j)th character of said reference character string is applied to said input device as one character to be collated,
   each cell $f_{i,j}$ being also coupled to a downward adjacent cell $f_{i+1,j}$ through a second transfer means which operates to transfer data stored in the cell $f_{i,j}$ to said cell $f_{i+1,j}$ each time one character to be collated is applied to said input device;
   each cell $f_{i,j}$ being further coupled to a lower rightward adjacent cell $f_{i+1,j+1}$ through a third transfer means which operates to transfer data stored in the cell $f_{i,j}$ to said cell $f_{i+1,j+1}$ if a character different from the j(th) character of the reference character string is applied to said input device as one character to be collated each time one character to be collated is applied to said input device;
   each cell $f_{i,j}$ being also coupled to the same lower rightward adjacent cell $f_{i+1,j+1}$ through an automatic setting means which operates to set the cells downstream of a set cell in a lower rightward coupling direction after each character to be collated is applied to said input device;
   whereby, the cells in the Mth column output the result of collation.

2. A system claimed in claim 1 wherein the character string comparator includes means for initializting the cell $f_{11}$ positioned at a first column and at a first row.

3. A method of determining the distance of a character string to be collated with respect to a reference character string in a character string collating system including an input device and a character string comparator composed of cells arranged in the form of a matrix having M columns and N rows (where M and N are integers), the method comprising the steps of:
   storing the reference character string, in parallel form, in the input device;
   serially receiving the character string to be collated into the input device;
   the input device generating a coincidence signal when a particular character of the character string to be collated is the same as a corresponding character of the reference character string and supplying the coincidence signal to a column of cells associated with the corresponding character of the reference character string;
   each cell transferring data stored therein to a rightward adjacent cell upon receipt of a coincidence signal;
   each cell transferring data stored therein to a downward adjacent cell each time the input device receives a character of the character string to be collated;
   each cell transferring data stored therein to a lower rightward adjacent cell when the coincidence signal is not present and the input device receives a character of the character string to be collated; and
   each cell, when in a set state, transferring data stored therein to cells in a lower rightward coupling direction when the input device receives a character of the character string to be collated;
   wherein the cells of the Mth column provide an indication of the distance between the reference character string and the characters of the character string to be collated received by the input device.

* * * * *